United States Patent [19]
Worley

[11] Patent Number: 5,784,190
[45] Date of Patent: Jul. 21, 1998

[54] ELECTRO-MICRO-MECHANICAL SHUTTERS ON TRANSPARENT SUBSTRATES

[75] Inventor: Eugene R. Worley, Irvine, Calif.

[73] Assignee: John M. Baker, Corona, Calif.; a part interest

[21] Appl. No.: 429,674

[22] Filed: Apr. 27, 1995

[51] Int. Cl.$^6$ .................................................. G02B 26/00
[52] U.S. Cl. .......................... 359/291; 359/846; 359/855
[58] Field of Search ................................. 359/290, 291, 359/295, 846, 850, 855

[56] References Cited

U.S. PATENT DOCUMENTS

| | | | |
|---|---|---|---|
| 5,078,479 | 1/1992 | Vuilleumier | 359/290 |
| 5,579,151 | 11/1996 | Cho | 359/291 |
| 5,629,794 | 5/1997 | Magel et al. | 359/290 |

*Primary Examiner*—David C. Nelms
*Assistant Examiner*—Dawn-Marie Bey
*Attorney, Agent, or Firm*—G. Donald Weber, Jr.

[57] ABSTRACT

Micro-mechanical flappers for use as an electronic display technology and methods related to the fabrication thereof are disclosed. These methods are consistent with standard silicon based semiconductor processing used to make integrated circuits. One embodiment shows how cross-talk or flapper-to-flapper interference is minimized using a Digital Signal Processor (DSP) to compensate for this undesirable effect. Also disclosed is the construction of a micro-mechanical flapper that uses a combination of two springs, viz. a leaf spring and a torsion spring, to reduce maximum bending stress and to lower operating voltage. Also, the spring construction is made such that axial stability is improved over a single leaf spring approach and a light shield is integrated onto the flapper assembly so that the overhead stationary electrode is simply a supporting glass plate with a transparent conducting layer over its surface. Another construction is also disclosed in which the flapper and light shield are integrated onto the overhead electrode assembly while the attracting stationary counter electrode, select transistor, and retention capacitor are located on another integrated assembly. Finally, an L-shaped attracting electrode is used to lower voltages required to bend the flapper spring.

24 Claims, 11 Drawing Sheets

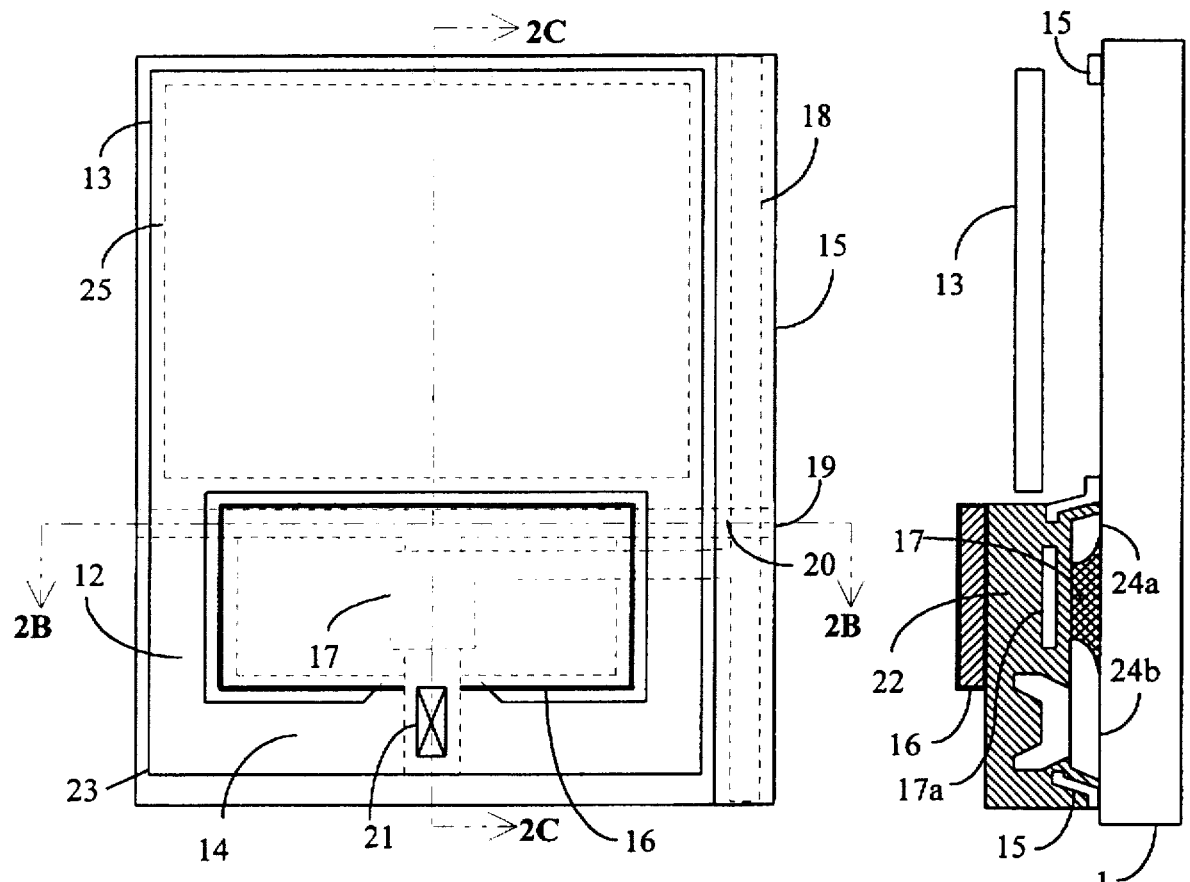
Fig. 2A
Fig. 2C
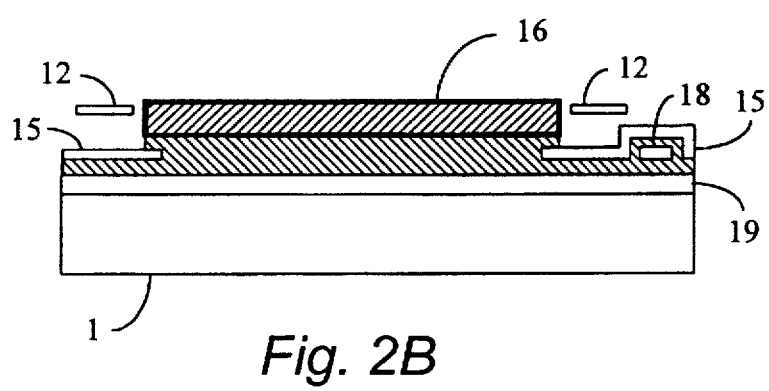
Fig. 2B

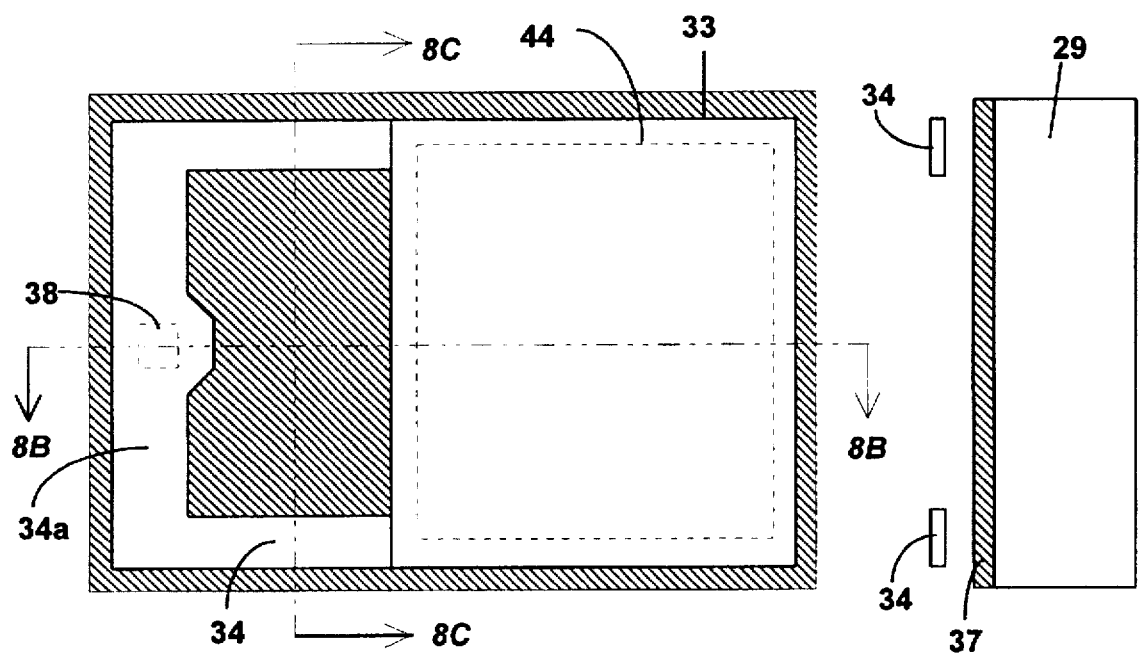
*Fig. 8A*
*Fig. 8C*
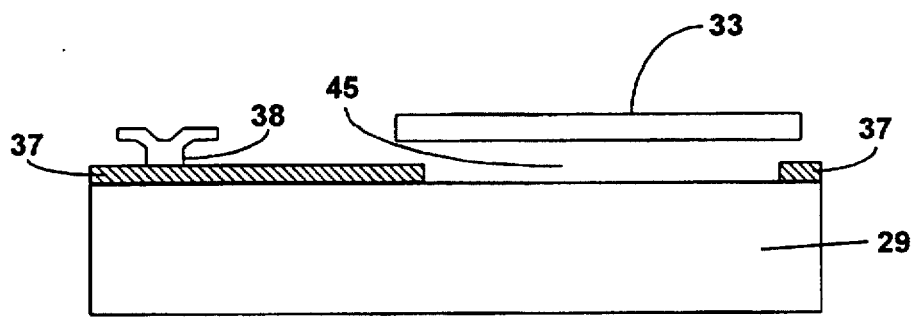
*Fig. 8B*

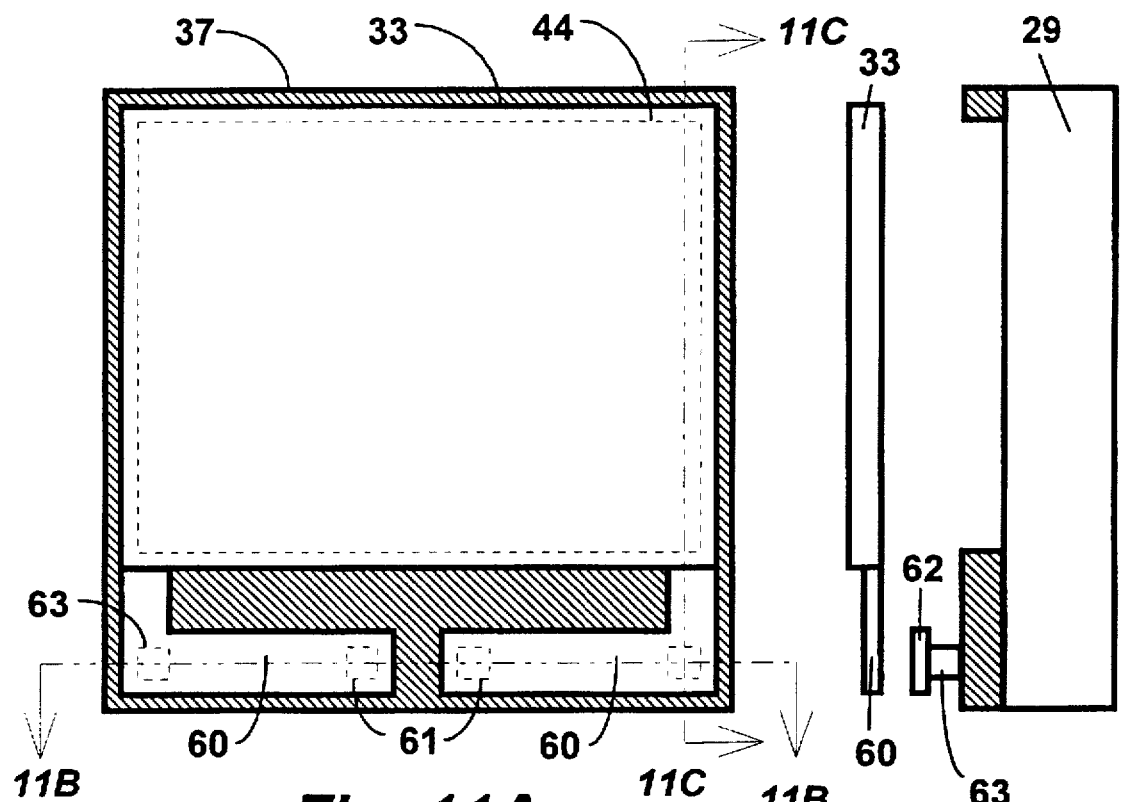
Fig. 11A
Fig. 11C
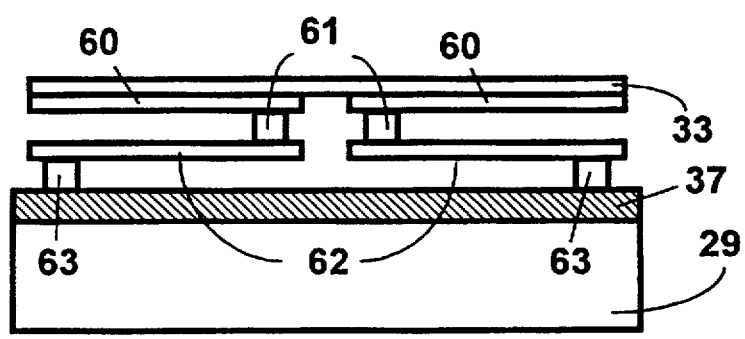
Fig. 11B

ELECTRO-MICRO-MECHANICAL SHUTTERS ON TRANSPARENT SUBSTRATES

BACKGROUND

1. Field of the Invention

This invention is directed to shutters, in general, and to micro-mechanical shutters mounted on transparent substrates and controlled by electro-static forces, in particular.

2. Prior Art

Numerous articles have appeared in technical journals describing how the techniques used to fabricate integrated circuits can be used to make micro-mechanical devices including micro-motors. Micro-motors are extremely small motors powered by an electric field rather than an electro-magnetic field as is the case for conventional electric motors. The typical micro-motor is comprised of a bearing, a rotor, and a stator.

Silicon integrated circuit technology has been used to create micro-motors. These micro-motors are merely small spinning discs of silicon and, as of yet, have no practical application.

Integrated circuit techniques have also been applied to fabricate devices comprising silicon on transparent insulating substrates. Representative devices include Silicon-On-Sapphire (SOS) and polysilicon on glass. In SOS techniques, a silicon film, the crystalline quality of which approaches that of bulk silicon, has been used to fabricate high performance VLSI circuits. For example, SOS technology has been used to build integrated circuits of considerable complexity, such as 64K static RAMS. While polysilicon on glass is of much lower quality, it has been good enough to fabricate switch transistors for active-matrix liquid crystal displays (AMLCD).

U.S. Pat. No. 5,078,479 (Vuilleumier) describes a micro-mechanical shutter array which is electrostatically operated. This shutter uses latching flaps made of conductive material which are selectively deflected into recesses in the substrate. This device does not have switching transistors or storage capacitors. A twist-type spring acts as a counter force for the electric force. The shutter has only two latching states and, therefore, can be used only for text-type displays, not pictorial displays. Consequently, it lacks an "active matrix" in LCD terminology. Also, the deep recesses do not allow standard planar integrated circuit processing to fabricate these devices.

U.S. Pat. No. 5,552,925 (Worley) teaches a simple flapper construction comprising a leaf spring, a flapper plate, and a select transistor. Over the flapper plate there exists an attracting counter electrode with a conductive transparent coating and a light shield. Key construction improvements which will be revealed here include reducing spring stress, lowering the force required to deflect the plate and hence lower the corresponding voltage, integrating the light shield or mask onto the flapper assembly, and a method to deal with unwanted pixel cross-talk or interference.

PRIOR ART STATEMENT

A preliminary patentability search has uncovered the following patents which are listed in numerical order without any special significance thereto.

U.S. Pat. No. 4,384,778; This patent shows a photographic camera exposure regulating element having a blade which moves to cover and uncover an aperture.

U.S. Pat. No. 4,564,836; This patent shows a shutter type display in which the shutters rotate under the effect of an electric field perpendicular to the plane of the carrier.

U.S. Pat. No. 4,778,254; This patent shows fiber optic shutter having a blade moved by a magnetic field.

U.S. Pat. No. 4,880,293; This patent shows an optic fiber shutter having a blade moved by a magnetic field.

U.S. Pat. No. 5,055,832; This patent shows display elements using a notched rotating disk, with the axis of rotation perpendicular to the light emission.

U.S. Pat. No. 5,078,479; Vuilleumier; This patent shows a display in which a light modulation device has electrostatic microflaps and means for matrix control.

The following publications are of interest and provide some pertinent background material which is incorporated herein.

Mehregany, Senturia and Lang, "Measurement of Wear in Polysilicon Micromotors", IEEE Transaction on Electron Devices, Vol. 39, No. 5, pp. 1136–1443, May 1992.

Fan, Tai, and Muller, "Integrated Movable Micromechanical Structures for Sensors and Actuators", IEEE Transaction on Electron Devices, Vo. 35, No. 6, pp. 724–730, June 1988.

Ratnam and Salama, "Novel High-voltage Silicon-On-Insulator MOSFET's", Solid-State Electronics, Vol. 35, No. 12, pp. 1745–1750, 1992.

SUMMARY OF THE INSTANT INVENTION

Micro-mechanical shutters for use as an electronic display technology and methods related to the fabrication thereof are disclosed. These methods are consistent with standard silicon based semiconductor processing used to make integrated circuits. One embodiment shows how cross-talk or flapper to-flapper interference is minimized using a Digital Signal Processor (DSP) to compensate for this undesirable effect. The shutters include micro-mechanical shutter assemblies that use combinations of two types of spring 5, viz. a leaf spring, and a torsion spring, to reduce maximum bending stress and to lower operating voltage.

In a first embodiment, the spring construction is made such that axial stability is improved over a single leaf spring approach and a light shield is integrated onto the flapper assembly so that the overhead stationary electrode is simply a supporting glass plate with a transparent conducting layer over its surface.

In a second embodiment, the flapper and light shield are integrated onto the overhead electrode assembly while the attracting stationary counter electrode, select transistor, and retention capacitor are located on another integrated assembly. An L-shaped attracting electrode is used to reduce the voltage required to bend the flapper spring.

BRIEF DESCRIPTION OF THE DRAWINGS

FIG. 2A is a plan view of the micro-mechanical flapper imaging assembly shown in FIG. 1.

FIGS. 2B and 2C are sectional views of the embodiment of FIG. 2A taken along lines 2B—2B and 2C—2C, respectively.

FIG. 8A is a plan view of the flapper assembly shown in FIG. 7.

FIGS. 8B and 8C are sectional views taken along the lines 8B—8B and 8C—8C of FIG. 8A, respectively.

FIG. 11A is a plan view illustrating another alternate embodiment of the spring element.

FIGS. 11B and 11C are sectional views taken along the lines 11B—11B and 11C—11C of FIG. 11A, respectively.

DESCRIPTION OF A PREFERRED EMBODIMENT

Figure 1:
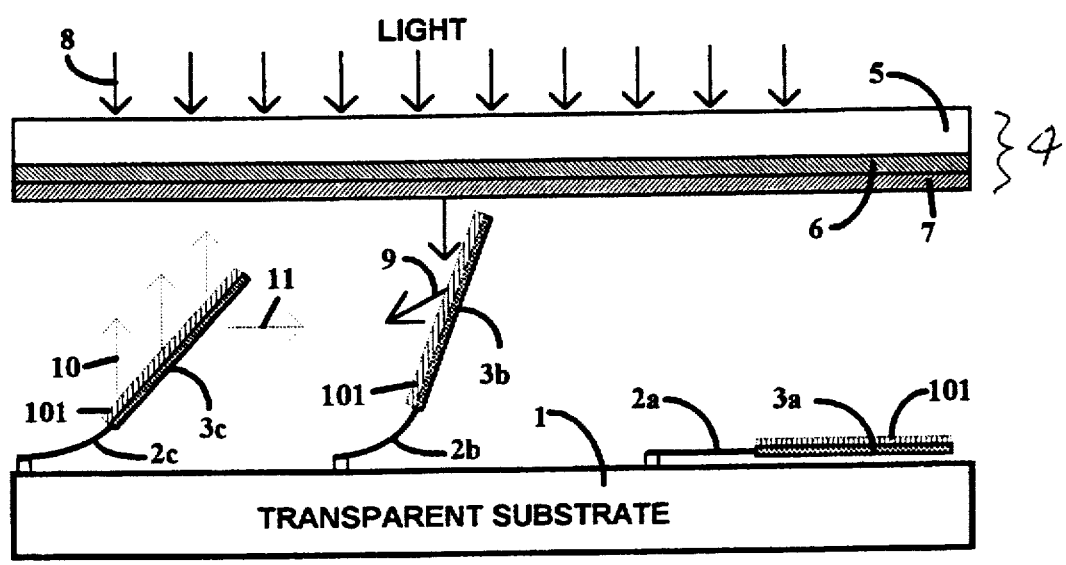
FIG. 1 is a partial cross-sectional view of a micro-mechanical flapper imaging assembly.

FIG. 1 shows a partial cross-sectional view of a simplified flapper imaging assembly. Substrate 1 is transparent and is used to support the flapper 200, the select transistor (not shown) and possibly a retention capacitor (not shown) as described in U.S. Pat. No. 5,552,925. Each flapper 200 consists of a spring 2 and a light gating plate 3. The spring 2 of each flapper is anchored to the substrate 1 in a suitable manner. As viewed in FIG. 1, the flapper assembly on the right (spring 2a and plate 3a) is shown in the closed position, the center flapper assembly (spring 2b and plate 3b) is shown in the open (extended) position, and the flapper assembly on the left (spring 2c and plate 3c) is shown in an intermediate position. A stationary electrode 4 placed above the flapper assembly is used as the attracting counter electrode.

The stationary electrode 4 includes a transparent substrate 5 and a transparent conductive coating 6 such as indium tin oxide (ITO) and an optional transparent insulator 7 such as deposited $SiO_2$ which is used to reduce the possibility of arcing from the flapper plate 3b (when in the extended position) to the conductive coating 6.

Light 8 is projected onto the top surface of the overhead substrate 5 from a suitable source and shines down onto the flapper assembly. The light can then be modulated depending on the angle of deflection of the respective electrically conductive flapper plate 3 as shown. The deflection angle is dependent upon the voltage applied to the flapper plate 3 relative to the voltage applied to the overhead electrode 4 and the spring characteristics of the respective springs. Each flapper assembly (i.e., spring 2 and plate 3) constitutes a pixel.

There can exist two forms of pixel-to-pixel interference, namely, reflected light interference and electrostatic force interference. As illustrated in FIG. 1, reflected light interference occurs when light, represented by solid arrow 9, reflects off one pixel plate 3b onto another pixel. Thus, one pixel can enhance the light passing through an adjacent pixel. Also, the electrostatic force, represented by dashed arrows 10, acting on a pixel plate, (e.g. plate 3c) has an electric field pattern which should ideally terminate only on the overhead stationary electrode 4. However, there can be an interfering force component 11 which is associated with an electric field which terminates on an adjacent flapper plate 3b.

Fortunately, a Digital Signal Processor (DSP) can be used to mitigate interference or pixel crosstalk effects. To illustrate how this can be accomplished, assume that the percent of light that a flapper allows to pass through a pixel, $\%L_n$, is a function, $f(V_n)$, of the applied voltage Vn of the nth pixel which is the pixel of interest. Also, assume that the pixel to the left of the n th pixel, i.e. pixel n−1, is able to modulate the nth pixel light according to the function $g(V_{n-1})$. Also, assume that the pixel to the right of the nth pixel, i.e. pixel n+1, is able to modulate the nth pixel light according to the function $h(V_{n+1})$. Thus, $$\%L=f(V_n)+g(V_{n-1})+h(\%L_{n-1}).$$

To an approximation then the voltage that should be applied to the n th pixel to achieve a desired light output, %Ln, is given by $$Vn=f^{-1}(\%L_n-h(f^{-1}(\%L_{n+1}))-g(f^{-1}(\%L_{n-1})))$$

Thus, the voltage applied to the nth pixel is not only a function of the desired light output from the nth pixel but also a function of the desired light output of the pixels to the left and right (i.e., the n-1th pixel and the n+1 pixel). The above, therefore, illustrates how a DSP can be used to mitigate the effects of pixel crosstalk by calculating a pixel's voltage based on the expected influence of adjacent pixels.

Another way light reflection from one pixel shutter plate to another can be lowered is to apply a thin anti-reflective coating 101 (shown in dashed outline) on the top surface of the plates 3a, 3b and 3c which is exposed to the light. In semiconductor processes this coating is, typically, a barrier metal such as Titanium Nitride or Titanium Tungsten. The disadvantage of applying this coating to the plate is that there will be increased heating of the shutter plate and structures connected to the shutter plate because of light absorption.

FIGS. 2A, B and C show a diagram of an improved flapper layout. The flapper consists of a leaf spring 12, a light shutter plate 13, a torsion spring 14, a lower light shield 15, an upper light shield 16, and a select transistor 17. This combination sits on top of a transparent substrate 1 such as glass, quartz, sapphire, or the like. The plate 13 and springs 12 and 14 are made from a single piece of conductive opaque material which can flex such as aluminum. Because of the thinness of the springs (approximately 300 A°), they are somewhat transparent. A light shield can be provided to block any light transmitted through the springs. The plate 13 must be thicker (approximately 800 A°) in order to be opaque. Note that the plate 13 does not have to be flexible. Another possible spring/plate material is a polyimide with a conductive, opaque coating such as aluminum, chromium, or the like as described in an EE Times article (Jun. 20, 1994, pg. 41).

In this design, the leaf spring 12 has been located at both ends (or sides) of the shutter plate 13 rather than at the center. This is done to minimize any potential twisting of the leaf spring 12 due to any slight asymmetrical electric force applied over the plate 13. The metal strip 14 acts like a torsion spring since, as the plate is lifted by the electrical force, a twisting force or torque will be applied to this segment.

The Y line 18 word line signal is used to turn the select transistor 17 ON or OFF and is realized using the gate electrode 17a of the select transistor 17 which is typically polysilicon. The select transistor is a MOSFET with drain 24a and source 24b diffusions. The X line 19 or video signal line is used to apply the signal voltage to the plate 13 via select transistor 17. In this case the X line is realized using the same silicon as the drain and source diffusions of the select transistor 17. To prevent the formation of a MOSFET gate at the intersection of the X and Y lines 20 a separate heavy implant is performed into the X line (silicon) before the Y line material (polysilicon) is deposited. Electrical contact between the select transistor 17 and the plate-spring assembly is made via a contact 21 which is also used to anchor the platespring assembly to the substrate 1 via the silicon island 24b associated with the select transistor 17.

Two layers of light shields are employed. Light shields are used to block the component light that is not gated or modulated by the shutter plate 13. The lower light shield 15 is used to block light around the edges of the plate 13 and to block light which might be partially transmitted through thin springs 12 and/or 14. The upper light shield 16 is used to block light that would otherwise strike the select transistor 17 thereby making it photo conductive. The most effective light blocking material that is available in silicon IC processing is aluminum. A minimum thickness of about 800A would be required to make the shutter plate 13 completely opaque. Separating the upper shield 16 from the select transistor 17 is a layer of deposited oxide 22.

A program was written to analyze the structure of FIG. 2. The analysis program incorporated the following assumptions:

1. The metal line 14 from the contact 21 to elbow 23 is treated as a torsion spring whose deflection equation is given by $$\tau = \frac{1}{3} \mu W t^3 \theta / L$$

where $\tau$=Torque,
$\mu$=Shear Modulus,
W=Width of Spring,
t=Thickness of Spring,
$\theta$=Deflection Angle, and
L=Length of Spring.

2. The metal line from the elbow 23 to the plate 13 is a leaf spring and is numerically treated using bending moment differential equations.

3. The springs 12 and 14 are of equal metal thickness while the plate 13 is of a different thickness.

4. The electric force is given by a differential form of the parallel plate equation.

Figure 3:
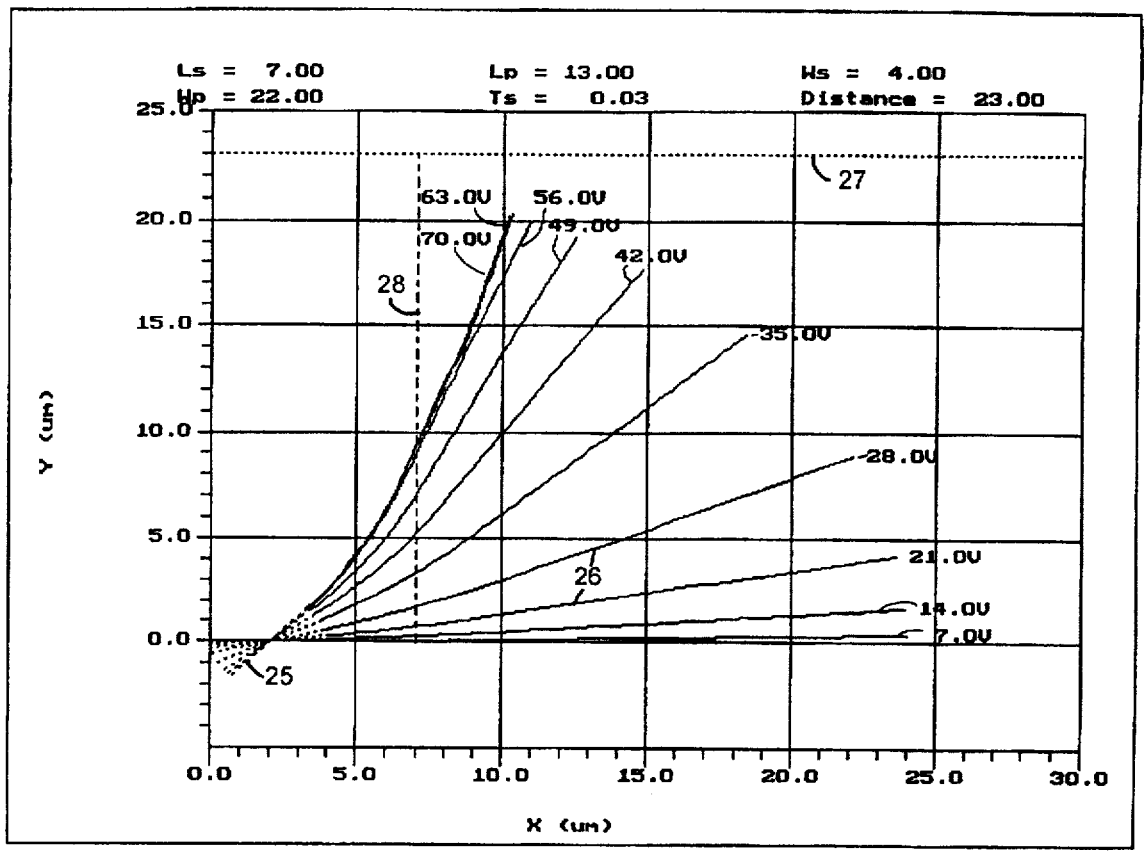
FIG. 3 is the plot of flapper cross-sections simulated with the parameters of Table I.

FIG. 3 is a plot of a flapper simulated cross-sections in which the parameters of Table I below were assumed.

TABLE I

| FLAPPER SIMULATION PARAMETERS | |
| --- | --- |
| Plate Width = 22 µm | Plate Length = 13 µm |
| Leaf Spring Width = 2.0 µm | Torsion Spring Width = 4 µm |
| Distance Separating Electrodes at 0V Bias = 23 µm | Spring Thickness = 0.03 µm |
| Plate Thickness = 0.08 µm | Spring Material = Aluminum |

The dotted lines 25 represent the cross-section of the torsion spring 14 and the solid lines 26 represent the cross-section of the leaf spring 13 and the plate 12 for various applied voltages. The dotted line 27 represents the overhead stationary electrode 6 and the dashed line 28 represents the location of the transition point between the leaf spring 13 and the plate 12 for the zero bias case. The region from line 28 to the end of the zero bias plate thus represents the maximum possible region over which the light can be gated. Note that for the last two cross sections which correspond to the highest applied voltages, i.e. 63 and 70 volts, respectively the applied voltage has little effect on increasing the deflection. In fact, a deflection limit is reached in which further increasing the voltage has virtually no effect on deflection. Because of this effect the end of the light modulating plate never reaches the physical light gating limit defined by line 28.

Figure 4:
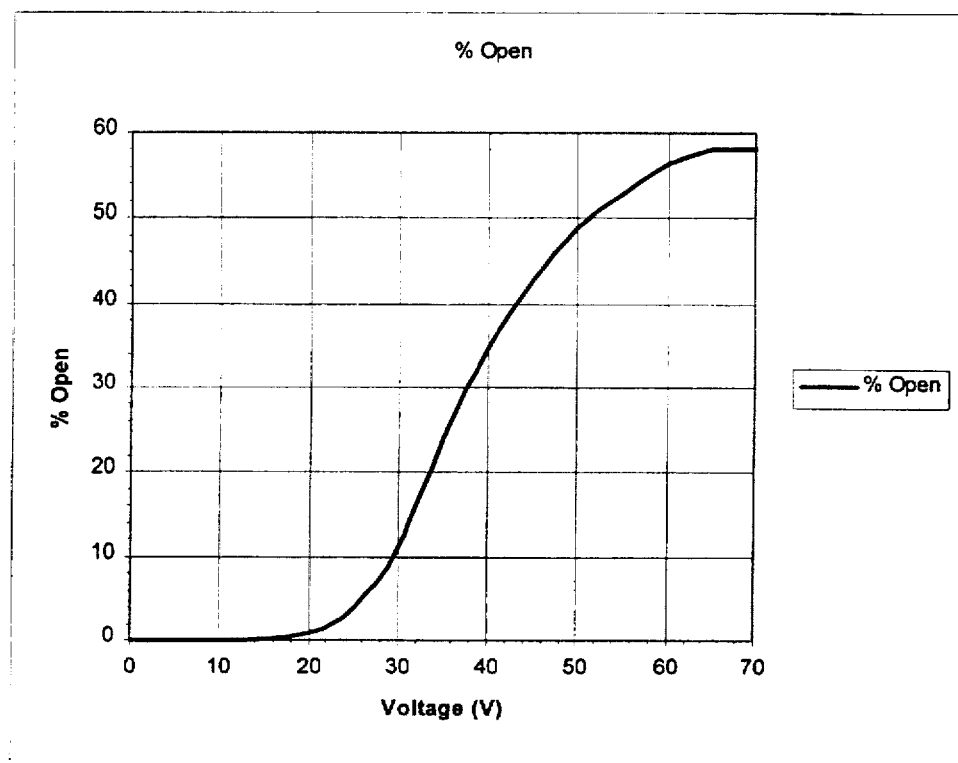
FIG. 4 is a plot of the flapper percent open as a function of applied bias voltage.

FIG. 4 shows the percent (%) the flapper is open as a function of applied bias voltage for the parameters listed in Table I. From FIG. 4, it can be seen that there is an "offset" voltage of roughly 25 V below which there is little modulation of the light. From about 25 V to 60 V there is a considerable modulation of the light with applied voltage. Above about 60 V, there is a diminishing modulation effect with increasing voltage. As mentioned U.S. Pat. No. 5,552,925 Ser. No. 08/117,532, an offset voltage can be applied to the stationary electrode in order to reduce the voltage swing applied to the flapper. Thus, the lower light shield 15 of FIGS. 2A, B and C is designed to block light with the flapper deflected slightly up.

Figure 5:
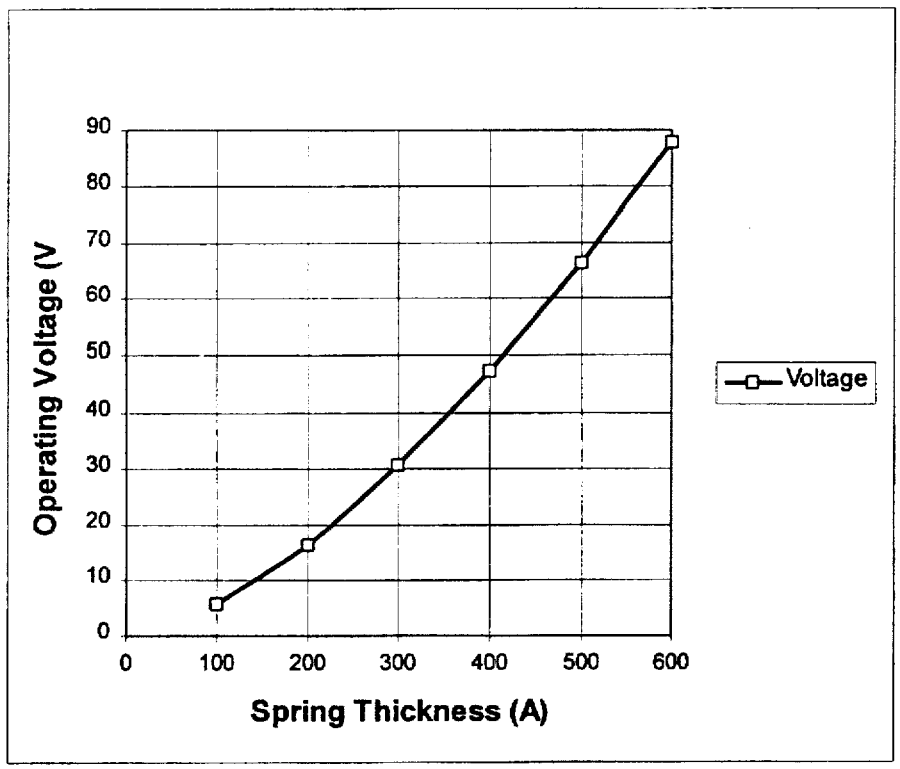
FIG. 5 is a plot of operating voltage as a function of spring thickness.

One key flapper design parameter is the thickness of the leaf and torsion springs. Both the operating voltage and the maximum stress are favorably impacted by decreasing film thickness of the springs. FIG. 5 shows a plot of voltage required to open the flapper shutter from 3% to 53% as a function of spring thickness using the parameters of Table I. It can be theoretically shown that the voltage required to achieve a given deflection angle varies as the spring thickness raised to the three halves power. Note from the plot in FIG. 5 that to achieve an operating voltage of, at most, a few tens of volts, the spring film thickness must be 500 Angstroms or less for aluminum. At these thicknesses, the aluminum spring can be expected to be not entirely opaque.

Figure 6:
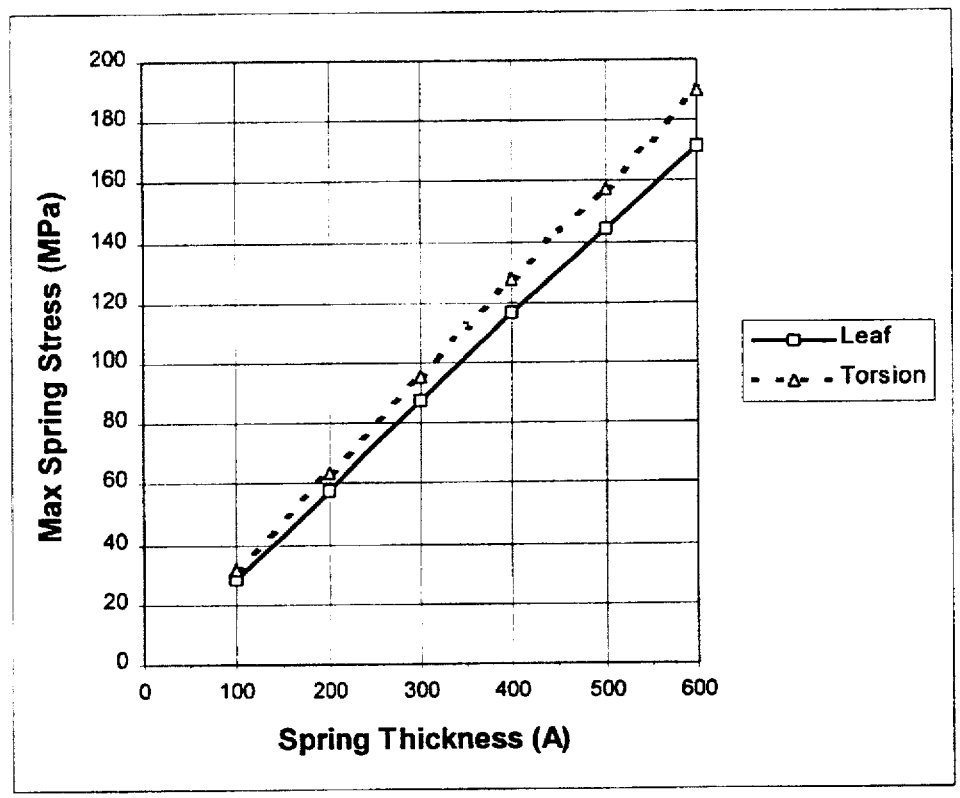
FIG. 6 is a plot of the maximum stress of the torsion and leaf springs (for an opening of 53% and using the parameters of TABLE I).

FIG. 6 shows plots of the maximum stress of the torsion spring and the leaf spring for an opening of 53% versus spring thickness using the parameters of Table I. According to the 1992 edition of University Physics, page 305, Table 11-3, the maximum tensile stress of Aluminum is 220 Mpa. To keep the stress well within these limits, a maximum stress of about 100 MPa should be observed. Using this criteria, then, the maximum spring thickness should be no more than about 300 Angstroms for a 53% maximum deflection.

Dynamic simulations were also performed on the flapper of FIG. 2 using the parameters listed in the Table I. The simulation revealed that it took 30 µs for the shutter plate to come within 10% of equilibrium. Thus, in the context of a NTSC standard television which has a frame rate of 30 pictures per second, this is an adequate time operation. That is, the pixel light output will be updated every 33.3 milliseconds.

Figure 7:
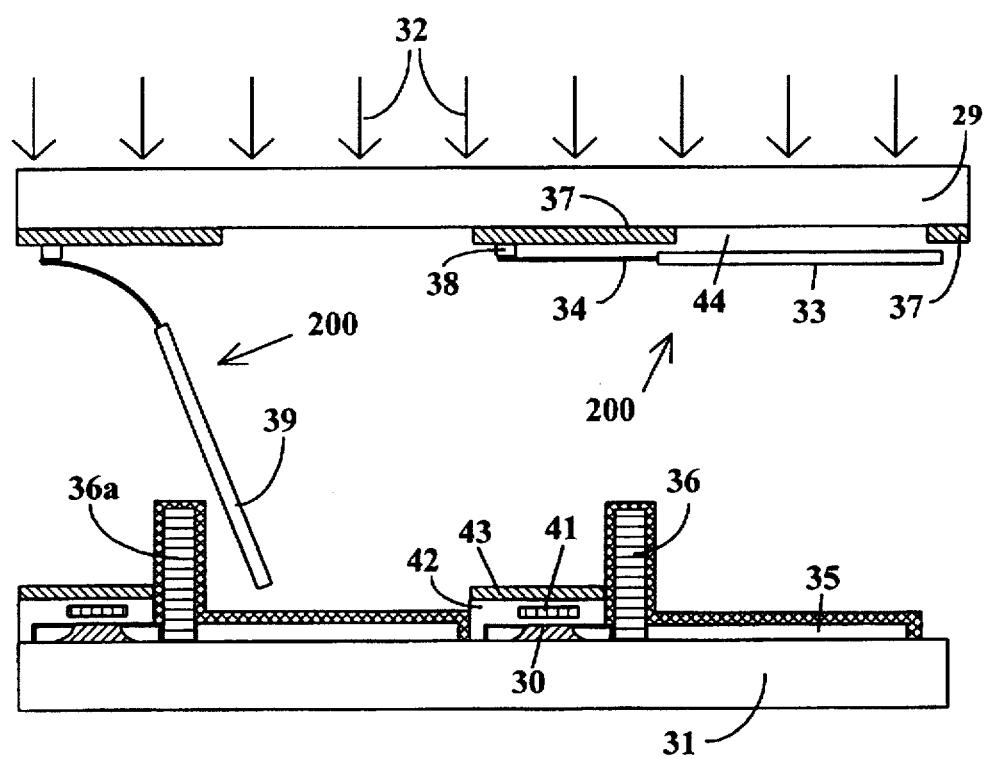
FIG. 7 is a partial sectional view of another embodiment of two flapper pixels.

FIG. 7 shows a partial cross-section of two flapper pixels in another embodiment of the invention. In this embodiment, the flapper assemblies are located on substrate 29, and the associated select transistor 30, retention capacitor, word line, and signal line are located facing the flapper assembly on a separate substrate 31, such as an overhead substrate 29 and a facing lower transparent substrate 31, respectively. Thus, each flapper assembly is separate from the associated select transistor 30, retention capacitor, word line, and signal line which are located on the facing transparent substrate 31. It will be recognized that the flapper assembly and the facing assembly may have orientations other than the upper and lower positions illustrated in FIG. 7 as long as their relative facing positions are maintained.

One advantage in locating the flapper assembly on a substrate separate from that of the select transistor 30 is that most of the heat generated from light absorption occurs on the flapper shutter assembly because it has opaque elements in the light path. On the other hand, the substrate 31 which supports the select transistor 30 has only a transparent stationary electrode 35 in the light path. The smaller the light absorption on the lower substrate 31, the lower the temperature of the select transistor 30 which translates into lower transistor leakage current. This, in turn, means better voltage retention between select intervals. Another advantage is that splitting up the functional elements of the complete flapper pixel between the upper and lower substrates reduces the manufacturing process complexity since all of the steps needed to make these elements are not combined into one interdependent process sequence.

The overhead substrate 29 is transparent and allows light 32 to be gated by plate 33. A spring assembly 34 is used as the counter force to the electric force existing between the plate 33 and a stationary horizontal electrode 35 and a stationary vertical electrode 36 which are located on the lower substrate 31. A light shield 37 disposed on the upper substrate 29 is used to block light which is not gated by the plate 33 and is also used to act as an interconnect which grounds all shutters. Thus, the flapper assembly uses three levels of deposited conductive material such as aluminum. They are, in the order of deposition, the light shield layer 37, the spring layer 34, and the shutter plate layer 33. Note that the shutter plate layer is also used to make the spring contact pedestal 38. Removable spacers that can be used to release the spring assembly and the plate 33 include polymers and deposited oxide. Removal of the spacer is done with an etch solution as is conventional.

The horizontal stationary electrode 35 must be transparent and can be made of either a thin layer of silicon as shown or of ITO. The vertical electrode 36 is used to enhance the horizontal electric bending force as can be seen for the deflected plate 39 which is being pulled to the left by the vertical electrode 36a in the left pixel as illustrated in FIG. 7. Thus, a lower applied voltage can be used to achieve full plate deflection with the addition of this vertical electrode 36. This electrode 36 can be readily fabricated with either a polysilicon on glass or quartz process or a Silicon-On-Sapphire process. Also, electrode 36 can be made using tungsten plug techniques.

With a polysilicon on glass or quartz process the first step is to deposit a several micron thick polysilicon layer. A Reactive Ion Etch (RIE) is then used to form a polysilicon post which becomes the vertical stationary electrode 36. A thin polysilicon layer is then deposited which can be used to make the select transistor 30 and possibly the horizontal stationary electrode 35. Electrode 35 can also be made of ITO. After the formation of the gate 41 of the select transistor, a deposited oxide 42 is applied. Finally, a metal light shield plate 43 is deposited and patterned. This shield 43 is used to prevent scattered light from reaching the select transistor 30. Any scattered light reaching the select transistor 30 may make the transistor photo conductive.

FIGS. 8A, 8B and 8C show a plan view and X and Y cross-section views, respectively, of the upper shutter assembly shown in FIG. 7. This design of this embodiment is essentially the same as the design of the embodiment of FIG. 2 except that the select transistor, word line, and signal line have been removed to the lower substrate. The shutter assembly sits on top of the transparent substrate 29 such as glass, quartz or the like. The first layer of metal 37 is the light shield which is used to block light from all areas other than the region where light is gated by the shutter plate 33. Note that the open area 45 in the light shield is made slightly smaller than the shutter plate 33. Also note that the light shield 37 must also block light that can pass through the thin translucent leaf spring 34 and torsion spring 34A. The light shield 37 which is conductive also acts as a grounding interconnect for all of the shutter plates of the overhead array.

Figure 9A:
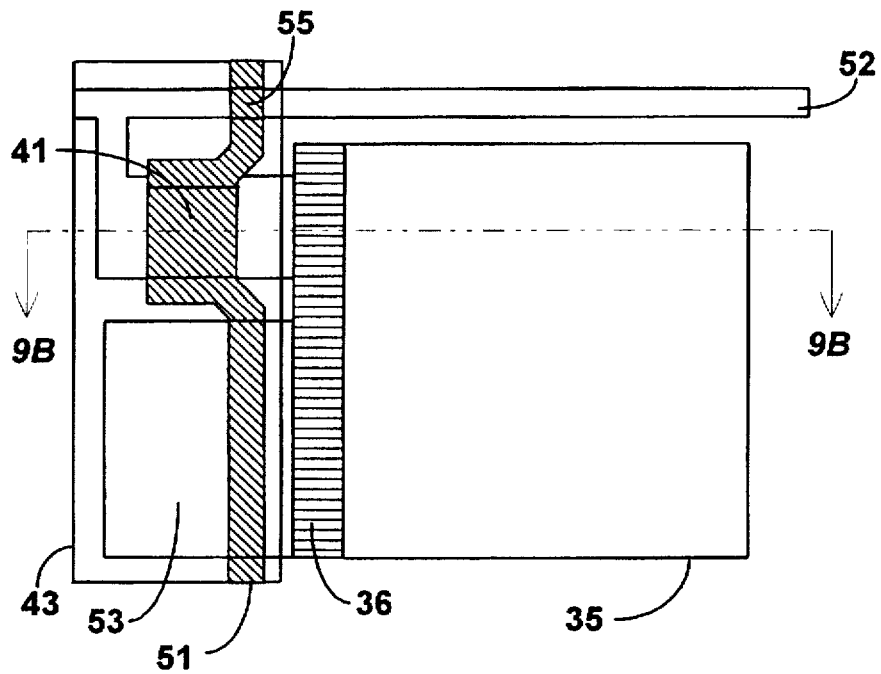
FIG. 9A is a plan view of the stationary electrode assembly of FIG. 7.
Figure 9B:
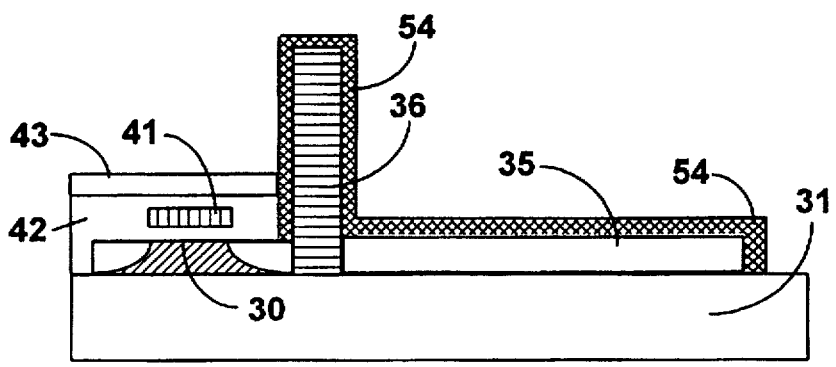
FIG. 9B is a sectional view of the stationary electrode assembly of FIG. 7 taken along line 9B—9B of FIG. 9A.

FIGS. 9A and 9B illustrate the stationary electrode, select transistor 30, word line 51, signal line 52, and retention capacitor associated with the lower assembly of FIG. 7. The retention capacitor is formed by using the silicon layer used to made the select transistor 30 and applying the drain/source implant to make one of the capacitor plates. This silicon capacitor plate 53 electrically attaches to the vertical electrode which is attached to the select transistor 30. The other plate is realized using the select transistor's light shield metal 43 (see FIG. 7) which is electrically grounded. It is noted that the light shield metal 43 has not been shown in the plan view of FIG. 9A in order that the underlying elements may be visible. An additional heavy implant is performed at the intersection 55 of the word line polysilicon 51 and the silicon or polysilicon signal line 52 so that a conducting region rather than a transistor channel is formed. The stationary electrode consists of the horizontal 35 and the vertical 36 electrodes, see FIG 7.

The flapper can also be operated as a two state light gating pixel wherein the gray scale is achieved by cycling the shutter between fully open and fully closed for periods of time. This activity is referred to as duty cycle modulation or dithering. If it occurs fast enough, the eye will see only the integrated effect and, therefore, perceive a shade of gray rather that a blinking pixel.

The vertical electrode can function as a flapper stop if the insulation coating 54 of the electrode (such as deposited $SiO_2$) is sufficiently thick to prevent electrical conduction from the stationary electrode to the flapper plate 33. It is noted that in the embodiment of FIG. 1, the overhead electrode 4 can also act as a stop for a two state flapper if it is positioned so that the flapper plate hits the electrode when the flapper plate is fully extended upward. Note that the insulating transparent layer coating 54 is required on the conductive layer 36 of the overhead electrode 4 in this case.

Figure 10A:
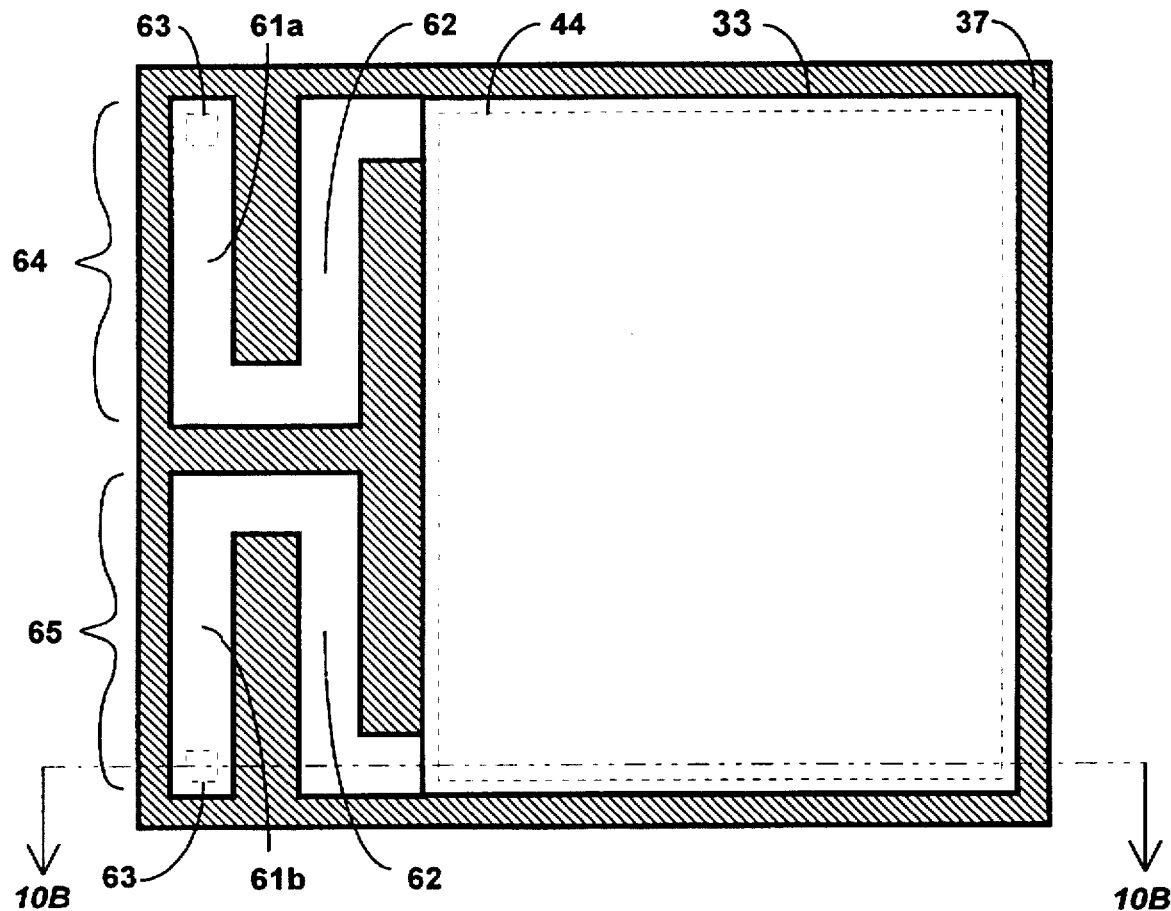
FIGS. 10A is a plan view of a flapper assembly illustrating an alternate embodiment of the spring element.
Figure 10B:
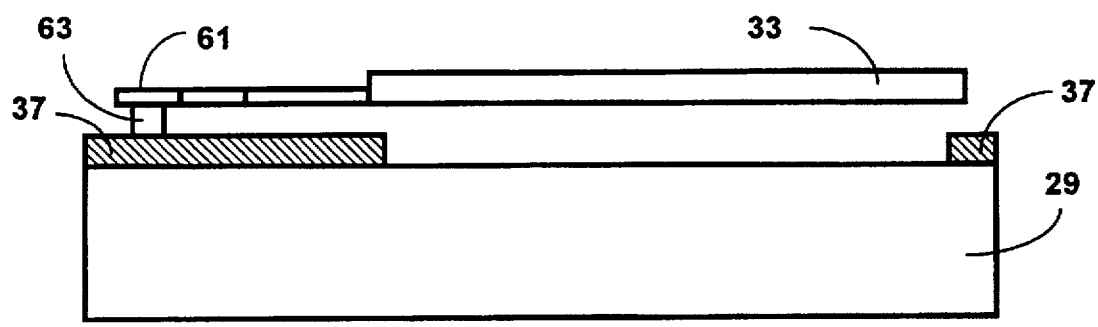
FIG. 10B is a sectional view taken along line 10B—10B in FIG. 10A.

FIGS. 10A and 10B show the construction of a flapper micro-shutter pixel similar to that of FIG. 8 except that the spring construction has been changed in order to reduce the area required by the spring assembly while providing a spring constant and level of spring stress similar to that of FIG. 8. As before, 33 is the shutter plate, 37 is the light shield, and 29 is the transparent substrate. The spring is a serpentine piece of flat flexible material such as thin aluminum and effectively has two sections per spring, 61 and 62, which act like torsion springs when the plate is deflected upward by the electric field. Two spring units, 64 and 65, are employed at each end of the plate to stabilize deflection of the plate. The springs are attached to the plate via conductive plugs or pedestals 63. Plugs are used in microelectronics to connect one layer of metal with another and are typically made of tungsten. Two or more torsion spring sections such as 61 and 62 are required in order to achieve a workable spring constant and, more importantly, to keep spring stress down in the 100 Mega-Pascal range in the case of aluminum as noted earlier.

FIGS. 11A, 11B and 11C show the construction of a flapper micro-shutter similar to that of FIG. 10 except that the two torsion spring elements are stacked instead of being side by side. Connected to the flapper plate 33 is the top torsion spring element 60. Spring element 60 then connects to the lower torsion spring element 62 via the plug 61. The lower spring element 62 then connects to the conductive light shield 37 via plug 63. The advantage of this arrangement is that the spring area is further reduced relative to the shutter plate area thus improving the optical efficiency at the expense of adding process steps.

Thus, there is shown and described a unique design and concept of a micro-mechanical flapper display and the methods related to the fabrication thereof. The particular configuration shown and described herein relates to a micro-mechanical flapper for use as an electronic display and the construction thereof using a combination of two springs. While this description is directed to a particular embodiment, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

I claim:

1. In a micro-mechanical shutter of the type wherein an electrically conductive micro-mechanical shutter plate is maintained over a transparent substrate by a conductive spring means and is deflected by an attracting counter electrode to modulate the angle of deflection of the shutter plate to modulate the amount of light passing through the shutter, the improvement wherein said spring means includes a combined torsion spring and a leaf spring means.

2. The shutter recited in claim 1 wherein,
said leaf spring means includes two leaf springs, each having a first end and a second end,
the first end of each leaf spring is coupled to a first end of the shutter plate; and
said leaf springs are coupled at said second ends to said torsion spring.

3. The shutter recited in claim 1 wherein,
said spring means is serpentine in configuration.

4. The shutter recited in claim 1 wherein,
said spring means includes a plurality of interconnected stacked spring elements.

5. The shutter recited in claim 1 wherein,
said torsion spring is attached to said shutter assembly at the center of the torsion spring.

6. The shutter recited in claim 1 including,
an anti-reflective coating disposed on the surface of said shutter plate that is exposed to light.

7. The micro-mechanical shutter recited in claim 1 comprising,
an array of electrically conductive micro-mechanical shutter plate electrodes, each of which defines a pixel, and
means for correcting for pixel to pixel interference between adjacent pixels to compensate for the effect of electric fields of adjacent pixels on each other.

8. The array recited in claim 7 wherein,
said means for correcting for pixel to pixel interference includes means for modulating the voltage applied to the electrodes of adjacent pixels to compensate for the effect of reflected light of adjacent pixels on each other.

9. The array recited in claim 7 wherein,
said means for correcting for pixel to pixel interference includes an antireflective coating disposed on the surface of shutter plate electrode that is exposed to light.

10. The array recited in claim 8 wherein,
said means for correcting for pixel to pixel interference includes an antireflective coating disposed on the surface of shutter plate electrode that is exposed to light.

11. The micro-mechanical shutter recited in claim 6 including;
a select transistor disposed on said transparent substrate;
a first light shield layer disposed for blocking light at the edges of the shutter plate; and
a second light shield layer for blocking light from striking said select transistor.

12. The shutter recited in claim 1 wherein,
said conductive spring means is a metal.

13. The shutter recited in claim 1 wherein,
said conductive spring means is aluminum.

14. The shutter recited in claim 1 wherein,
said conductive spring means is a flexible insulator coated with a conductive film.

15. The shutter recited in claim 14 wherein,
said conductive spring means is polymide coated with chromiun.

16. The shutter recited in claim 11 wherein,
said attracting counter electrode includes:
a transparent insulating substrate; and
a transparent conductive layer disposed on said substrate.

17. The shutter recited in claim 16 wherein,
said transparent conductive layer is indium tin oxide.

18. The shutter recited in claim 16 wherein,
said attracting counter electrode includes a transparent insulating layer disposed on said transparent conductive layer.

19. The shutter of claim 18 wherein,
said transparent insulating layer is silicon dioxide.

20. The micro-mechanical shutter recited in claim 1 wherein,
said transparent substrate is adapted for receiving light on a first side of said substrate;
said shutter disposed on the side of said substrate opposite the side for receiving light; and
light shield means for blocking light which is not modulated by said shutter.

21. The shutter recited in claim 20 including:
a second transparent substrate;
a select transistor disposed on said second transparent substrate; and
a first transparent electrode disposed on said second transparent substrate.

22. The shutter recited in claim 21 including,
a retention capacitor disposed on said second transparent substrate;
an X select line,
a Y signal data line, and
a light shield for the select transistor, said light shield forming one plate of said retention capacitor.

23. The shutter recited in claim 22 including,
a second transparent electrode coupled to said first transparent electrode,
said second transparent electrode disposed on said second transparent substrate and oriented normal to said first transparent electrode.

24. The shutter recited in claim 23 wherein,
said first and second transparent electrodes form an L-shaped electrode.

* * * * *